INVENTORS
A. A. GRIFFITH AND D. EYRE
By
Mawhinney & Mawhinney
ATTORNEYS

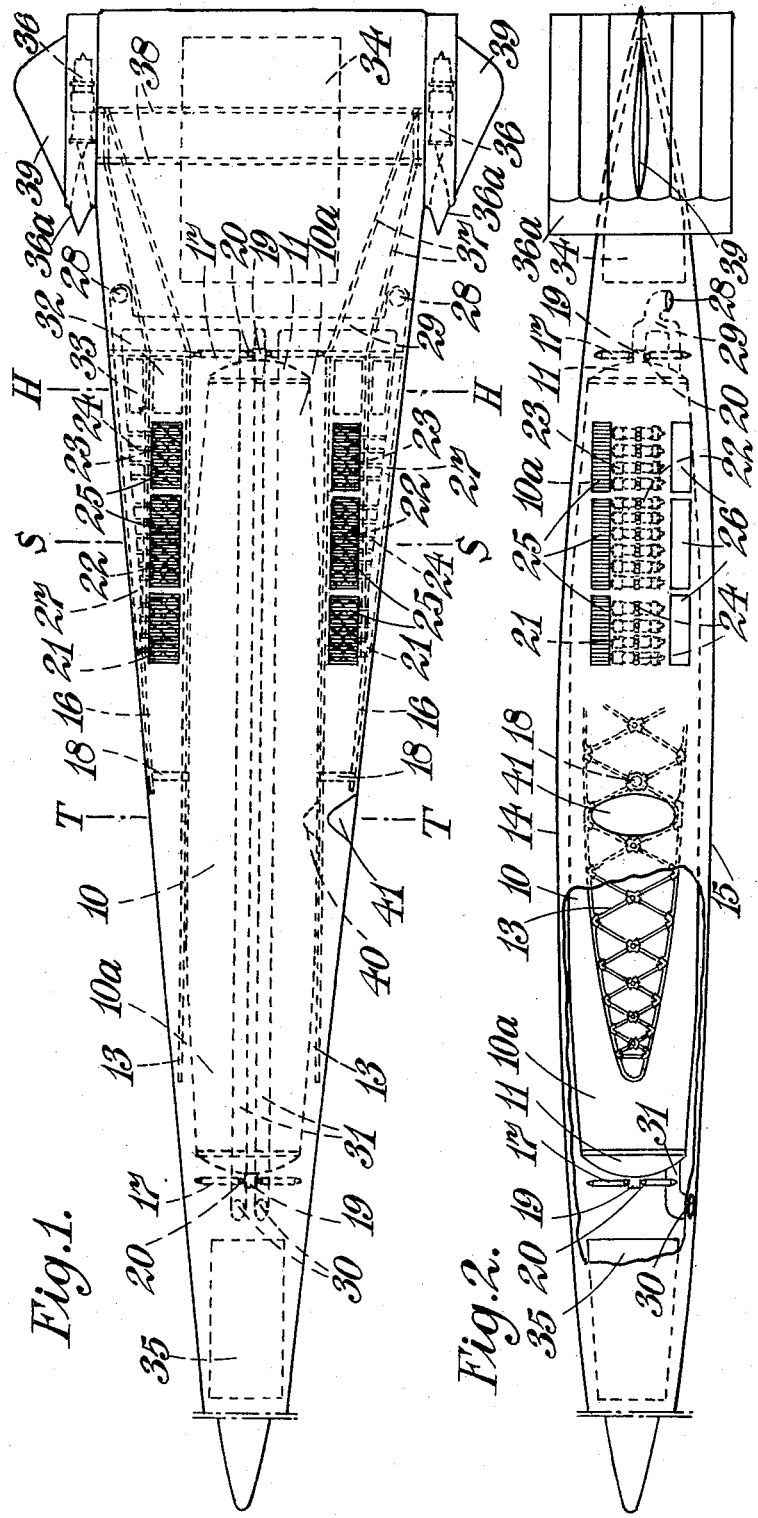

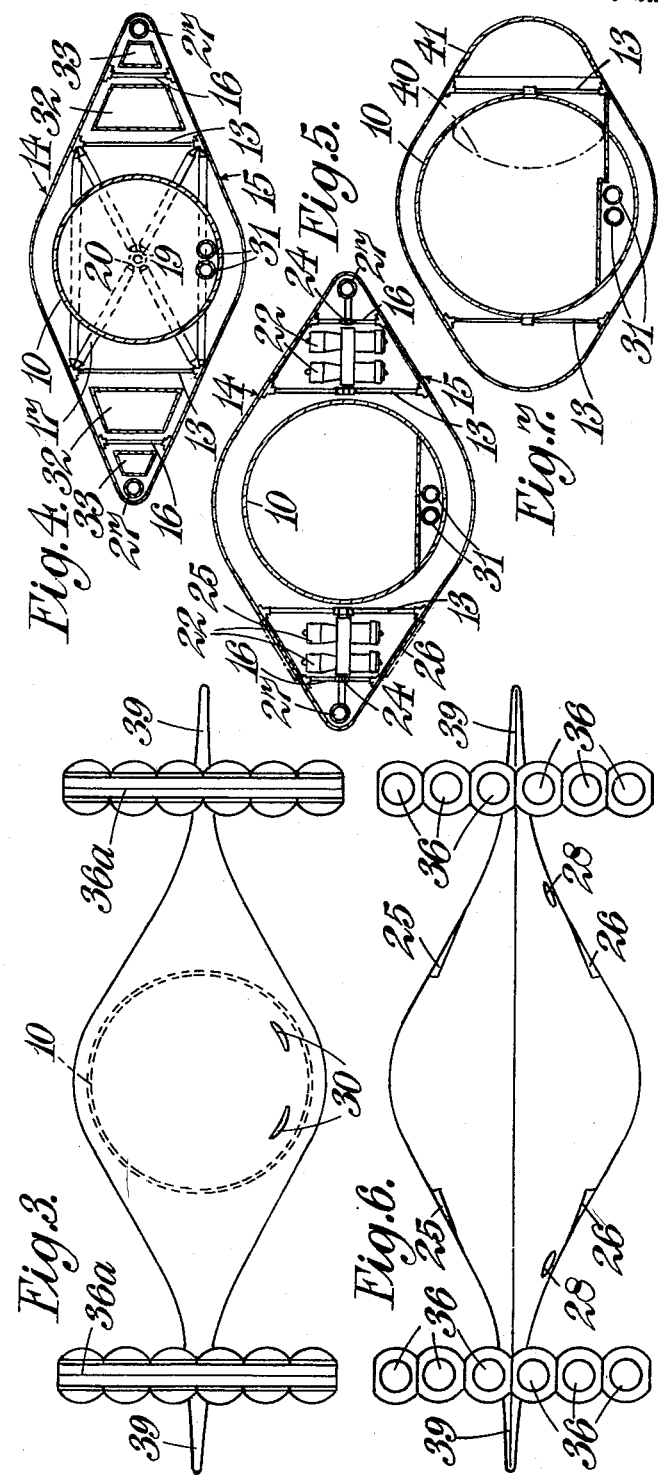

United States Patent Office 2,982,501
Patented May 2, 1961

2,982,501
AIRCRAFT

Alan Arnold Griffith, Derby, and Donald Eyre, Alvaston, England, assignors to Rolls-Royce Limited, Derby, England, a British company Filed Aug. 31, 1956, Ser. No. 607,519

Claims priority, application Great Britain Sept. 8, 1955

13 Claims. (Cl. 244—119)

This invention relates to aircraft and relates more particularly though not exclusively to aircraft having propulsion means to produce forward thrust, an aerofoil surface to generate lift in forward flight, and gas-turbine jet-propulsion power plant means to produce lift forces on the aircraft independently of lift forces generated aerodynamically by forward flight, said power plant means being independent of said propulsion means. Such an aircraft is described and claimed in patent application Serial No. 538,874, filed October 6, 1955, in the name of A. A. Griffith, and will be referred to hereinafter as "a jet lift aircraft as described."

According to the present invention in one aspect an aircraft comprises a cabin which is mounted within the structure of the aircraft with freedom for relative expansion between the cabin and the aircraft in each of the three senses.

According to the present invention in another aspect, a jet lift aircraft as described comprises structure forming the body of the aircraft and having an external surface which is in plan substantially an isosceles triangle of small apex angle, the apex being at the nose of the aircraft, and is in side elevation of elongated lenticular form, and comprises also a cabin of substantially cylindrical shape supported within the body in spaced relation to the external surface. By a small apex angle is meant an apex angle of between 6° and 20°, and by elongated lenticular form is meant a lenticular form in which the length of the aircraft is at least ten times its height in side elevation.

Preferably, the axis of the cylindrical cabin lies on the axis of symmetry of the body structure which passes through the apex of the isosceles triangle.

In a preferred form, the external surface of the body of the aircraft has a circular cross-section (at right angles to the axis of symmetry) near the nose and the cross-section changes rearwardly through a substantially elliptical form to a substantially lenticular shape adjacent the trailing edge of the body, which forms the base of the isosceles triangle.

One embodiment of this invention will now be described by way of example with reference to the accompanying drawings of which—

Figure 1 shows an aircraft in accordance with the invention in plan view,

Figure 2 shows the aircraft in side elevation with parts cut away,

Figure 3 shows a front view of the aircraft to a different scale,

Figure 4 is on the scale of Figure 3 and is a view on the line H—H in Figure 1,

Figure 8:
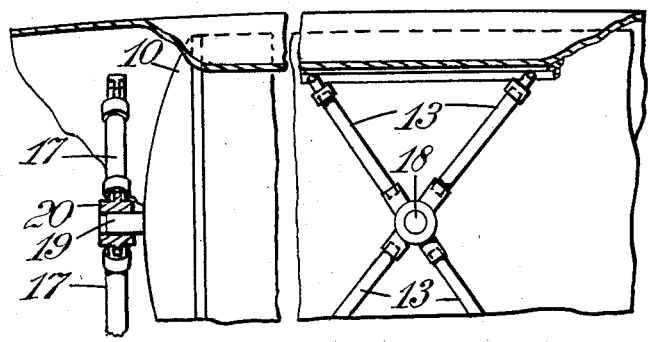
Figure 9:
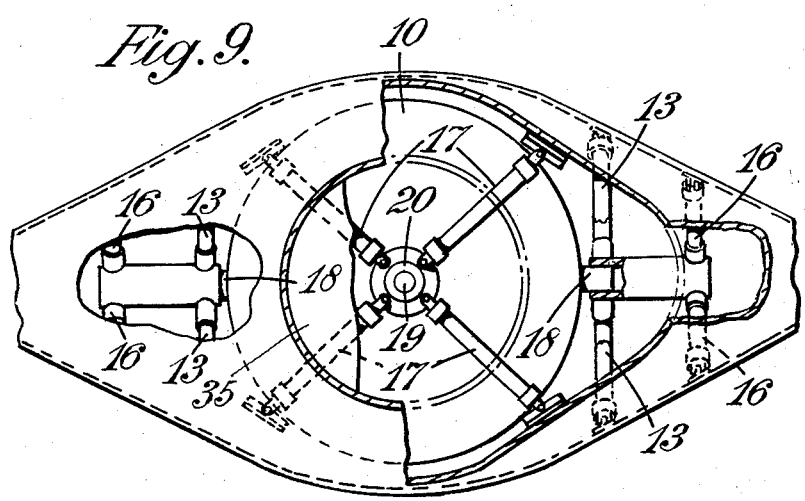

Figure 5 is on the scale of Figure 3 and is a section on the line S—S in Figure 1, Figure 6 is on the scale of Figure 3 and is a rear view of the aircraft, Figure 7 is on the scale of Figure 3 and is a section on the line T—T in Figure 1, Figure 8 shows the mounting for the cabin in side elevation, parts of the aircraft being broken away to show details of construction, and Figure 9 is a section of Figure 2 but drawn to a larger scale with parts broken away behind the plane of the section to show details of the construction.

Referring to the drawings, it will be seen that the body of the aircraft is in plan view formed substantially as an isosceles triangle, and the aircraft is thus of the type often referred to as of delta form; the apex of the triangle forms the nose of the aircraft. The apex angle is shown as being 12° and thus the sweepback of the leading edges of the body of the aircraft is 84°. The apex angle may however vary between, say 6° and 20°, corresponding to sweepback angles of 87° and 80° respectively.

In side elevation (Figure 2) the body of the aircraft is of elongated, substantially lenticular aerofoil form and is formed of two parabolic arcs modified locally to suit the requirements of the design. For example the arcs are modified in the region of the nose in the sense of increasing their curvature.

The body of the aircraft thus acts as the lifting aerofoil.

The aircraft comprises a substantially cylindrical cabin 10 which extends lengthwise for more than half the total length of the aircraft and which is truly cylindrical over a greater part of its length and tapers slightly at each end 10a, the ends being closed by part-spherical bulkheads 11. The bulkheads may however be plane if desired. The cabin 10 is a rigid structure of itself and accommodates the useful load of the aircraft in the form of passengers, freight or the like. The axis of the cabin is coincident with the axis of symmetry of the aircraft through its nose.

The cabin is coated externally with a layer of thermal insulation, because it must be maintained internally at an equable temperature for the passengers and crew, while the external surface of the aircraft is at a high temperature. As the insulation, which may for example be a layer of kapok covered with a layer of glass wool, is on the outside of the cabin, the fittings and furnishings may be attached directly to the interior of the cabin structure, and will also be at an equable temperature.

The aircraft also comprises a pair of longitudinally and vertically-extending lattice frameworks 13, one on each side of the cabin 10. Each framework extends vertically between the upper and lower portions 14, 15 respectively of the external surface of the aircraft, and each extends longitudinally from a point somewhat aft of the forward end of the cabin 10 to a point substantially level with the rear end of the cabin.

There are likewise provided a pair of subsidiary frameworks 16 which also extend longitudinally of the aircraft and vertically between the upper and lower portions 14, 15 of its external surface, and which, together with the first-mentioned frameworks 13 and the intermediate parts of the upper and lower portions 14, 15 of the surface structure of the aircraft, form a rigid box-like structure (see Figures 8 and 9). The subsidiary frameworks 16 extend longitudinally from slightly forward to a midpoint of the cabin 10 to level with the rear end of the cabin.

A pair of transverse lattice frameworks 17 also extend vertically between the upper and lower portions 14, 15 of the surface of the aircraft, one just forward and one just aft of the cabin 10.

The frameworks 13, 16 and 17 may be constructed in accordance with United States patent application Serial No. 549,600, now Patent No. 2,941,760, which proposes that internal structural members of an aircraft designed for flight at supersonic speeds may be hollow and that provision is made for passing heated air through the structural member.

The cabin 10 is supported at its mid-length on trunnion mountings 18 which engage with both the main and the subsidiary frameworks 13, 16 and the cabin, is thus located against axial movement at its mid-point. The trunnion mountings 18 include members which slide in the sockets provided by the frameworks, to allow for lateral expansion of the aircraft structure relative to the cabin in the direction of the axes of the trunnion mountings 18.

The forward and rear ends 10a of the cabin 10 are each provided with a spigot member 19 lying on the axis of the cylinder and sliding within a socket 20 in the corresponding transverse frameworks 17 as best seen in Figures 8 and 9, to allow for relative longitudinal expansion of the cabin and the structure of the aircraft. These spigots and sockets maintain the axis of the cabin on the axis of symmetry of the triangular plan form of the aircraft.

Due to the clearance between the cabin 10 and the external surface portions of the aircraft, the cabin is also free for expansion and contraction relative to the aircraft body in the third sense, that is in a direction at right angles to both the axes of the trunnion mountings 18 and the axes of the spigot members 19.

Between the main frameworks 13 and subsidiary frameworks 16 on each side of the cabin 10 there is provided a series of lift engines, consisting of three banks of engines 21, 22, 23 respectively, the forward bank 21 and rear bank 23 on each side each containing eight lift engines and the centre bank 22 on each side containing twelve lift engines; the engines are arranged in pairs with the axes of each pair in the same transverse plane. Each series of lift engines is disposed symmetrically forward and aft of the centre of gravity of the aircraft, so that when these are running there is no resultant moment of their thrusts about the centre of gravity.

The lift engines may be arranged to be capable of pivoting about transverse axes between a position in which they are inclined at 30° to the vertical to give a forward component of thrust and a position in which they are inclined at 30° to the vertical to give a rearward component. Each pair of lift engines may be mounted in the frameworks 13, 16 adjacent the mid-length of the engines by means of trunnion mountings 24. There may also be provided a louvered air intake 25 comprising a series of doors in the upper surface 14 of the aircraft for each of the banks of engines and a louvered outlet comprising a corresponding series of doors 26 in the lower surface 15 of the aircraft. The vanes may be arranged, as described in patent application Serial No. 589,941, filed June 7, 1956, now Patent No. 2,936,969, to provide means for starting the lift engines of the aircraft in flight by affording means to conduct ram air pressurised by the forward flight of the aircraft to the compressor intakes of the lift engines 22, 23, 24, so as to cause the engines to windmill at such a rotational speed that on injection and ignition of fuel in their combustion chambers that the rotation of the engines becomes self-sustaining. The doors 26 in the lower surface are preferably arranged to be blown open by the lift engines, and are held closed by the airstream during high-speed flight.

The aircraft may also comprise air tappings from the lift engines for the purpose of providing jets of air to control the aircraft in hovering flight and at low forward speeds. The air may be tapped off from the compressors of the lift engines through the trunnion mountings 24 which will be hollow, and may be led to ducts 27 which lie in the spaces between the subsidiary structural frameworks 16 and the leading edges of the surface of the aerofoil body. The ducts lead to nozzles 28 disposed in the lower portion 15 of the surface of the aircraft near the base angles of the triangular shape, and there is also provided a communicating duct 29 which interconnects the first-mentioned ducts 27 and lies transversely of the aircraft between the nozzles 28 and to the rear of the cylindrical cabin 10. Further nozzles 30 for the same purpose are provided near the nose of the aircraft, immediately ahead of the cabin 10, and a pair of ducts 31 are led from the communicating duct 29, through the cabin 10 below the cabin floor 10b (as seen in Figure 5), to the forward nozzles 30 to feed them. Suitable flexible connections will be provided where the ducts pass through the cabin wall.

A pair of fuel tanks 32 are provided to the rear of the banks of lift engines and between the main and subsidiary frameworks 13, 16 and extend between the upper and lower portions 14, 15 of the surface of the aircraft. Somewhat smaller tanks 33 are provided next to these tanks and outboard of the subsidiary frameworks 16. A fuel tank 34 is provided to the rear of the cylindrical cabin 10 and a further fuel tank 35 is provided in the nose of the aircraft forward of the cylindrical cabin. The fuel tanks are symmetrically disposed about the axis of symmetry of the aircraft in plan view. The fuel tanks are so arranged that fuel may be drawn from them in flight in such a way that the longitudinal travel of the centre of gravity of the aircraft is controllable. The resultant of the moments of the tanks, when these are full of fuel, about the centre of gravity is small.

The aircraft is propelled in forward flight by twelve gas-turbine jet-propulsion engines 36 arranged in two banks of six. Each bank is disposed near one of the base angles of the triangular shape of the aircraft as seen in plan, and lies in a vertical plane parallel to the longitudinal axis of the aircraft, and it is arranged that the intakes 36a of the banks of engines project slightly ahead of the lines of the leading edges of the surface of the aerofoil body, that is, of the equal sides of the triangle. The engine intakes 36a may be as described in U.S. Patent No. 2,840,322. The engines 36 are supported by structural members 37 which extend from the rear ends of the main and subsidiary frameworks 13, 16 on each side of the axis of symmetry, and by members 38 which extend transversely across the aircraft between the free ends of the members 37. The banks of engines form directional stabilizing fins.

The parts 39 of the aerofoil body outboard of the vertical banks of engines 36 may be pivotable to act as a control surface, and conveniently the pivot axis passes between a pair of the engines 36 of each bank.

In order to provide space for an entry door 40 into the cabin 10 of the aircraft, the lattice members of the main framework 13 may be slightly spaced apart as shown in Figure 2 and suitably reinforced. The door 40 of the cylindrical cabin may be substantially oval seen in side elevation of the aircraft and may retract inwards. The door 41 in the outer surface of the aircraft will be of corresponding form, as seen in Figures 2 and 7.

It will be appreciated that the cylindrical cabin 10 will be pressurised, as is conventional. The flight crew will be accommodated in the forward part of the cylindrical cabin.

It will be seen that in addition to providing an aircraft of an aerodynamic shape which is close to the optimum for flight at speeds between two and three times the speed of sound, the present invention enables the elements of the aircraft design such as the cabin, the engines and fuel tanks to be advantageously positioned to meet the various requirements. The invention for example, enables the pressurised cabin to be of substantially cylindrical form as is desirable for structural reasons; it enables the lift engines to be mounted so that the resultant of their thrust acts through the centre of gravity of the aircraft; and further, it enables movement of the centre of gravity of the aircraft, owing to consumption of fuel, to be controlled. Also the invention permits the main engines to act as stabilizing fins, so that no separate fins are needed; furthermore the invention enables the cabin to be insulated on its external surface against the heat generated in flight, which greatly facilitates the mounting of the fittings and furnishings within the cabin.

We claim:

1. An aircraft capable of forward flight at speeds greater than Mach 1, comprising a body structure including parts forming the entire external surface of the aircraft which are subject to friction heating in high speed flight, and a separate cabin structure, the cabin structure being entirely enclosed within the body structure of the aircraft, and means supporting the cabin structure within the body structure with freedom for relative expansion between the cabin structure and the body structure in the direction of each of the three dimensions of the cabin structure, whereby the cabin structure is insulated from the effects of said friction heating of the external surface of the body structure.

2. A jet lift aircraft which is capable of forward flight at speeds greater than Mach 1 and comprises a body structure including parts forming the entire external surface of the aircraft which is in plan substantially an isosceles triangle of small apex angle, the apex being at the nose of the aircraft, and is in side elevation of elongated lenticular form which parts are subject to friction heating in high speed flight; and a closed cabin structure of substantially cylindrical shape accommodated within and entirely enclosed within the body structure, and means supporting the cabin in spaced relation to the parts of the body structure forming the external surface with freedom for relative expansion between the cabin and the aircraft in the direction of each of the three dimensions of the cabin structure whereby the cabin structure is insulated from the effects of said friction heating of the parts of the body structure forming the external surface.

3. A jet lift aircraft as claimed in claim 2, having the substantially cylindrical cabin supported with its axis substantially coincident with the axis of symmetry of the body structure which passes through the apex of the isosceles triangle.

4. A jet lift aircraft as claimed in claim 2, wherein the external surface of the body of the aircraft has a circular cross-section at right angles to the longitudinal axis of symmetry of the aircraft near the nose and the cross-section changes rearwardly through a substantially elliptical form to a substantially lenticular shape adjacent the trailing edge of the body, which forms the base of the isosceles triangle.

5. A jet lift aircraft as claimed in claim 2, comprising two series of gas-turbine jet-propulsion lift engines, supported within the body structure one on each side of the cabin structure and each series of lift engines extending both forward and aft of a line passing through the centre of gravity of the aircraft and normal to the longitudinal axis of symmetry of the aircraft.

6. A jet lift aircraft as claimed in claim 5, comprising also louver means in the upper and lower surfaces of the body structure, said louver means being capable of being opened in flight, and means to conduct ram air which is pressurised by the forward flight of the aircraft and enters the aircraft through the louver means in the upper surface, air intakes of the lift engines to cause the engines to windmill at such rotational speed that on injection and ignition of fuel in their combustion chambers the rotation of the engines becomes self-sustaining.

7. A jet lift aircraft as claimed in claim 2, comprising also fuel storage tanks in the forward part of the body structure forwardly of the cylindrical cabin and in the rear part of the aircraft near the rear end of the cylindrical cabin, so that by drawing fuel in flight from the forward and rear tanks the fore-and-aft movement of the centre of gravity of the aircraft may be controlled.

8. A jet lift aircraft as claimed in claim 2, comprising propulsion means including gas-turbine jet-propulsion engines mounted in two vertical banks, each having a plurality of said engines, each bank of engines projecting above and below the surface of the body structure of the aircraft near the base angles of the triangular plan form, said engines having air inlets disposed to be at least slightly ahead of the respective leading edges of the surface of the body.

9. A jet lift aircraft as claimed in claim 2, wherein the means supporting the cabin structure comprises a first pair of frameworks extending longitudinally of the aircraft and vertically substantially between upper and lower portions of the external surface of the body structure, one on each side of the substantially cylindrical cabin structure, and a second pair of frameworks extending transversely of the aircraft and vertically substantially between upper and lower portions of the external surface, one forward and one aft of the substantially cylindrical cabin structure.

10. A jet lift aircraft as claimed in claim 9, wherein the cabin structure is supported in the longitudinal frameworks through trunnion mountings slidable in sockets in the longitudinal frameworks.

11. A jet lift aircraft as claimed in claim 9, wherein the cabin structure is located axially with respect to the longitudinal frameworks adjacent the mid-length of the cabin structure and the transversely-extending frameworks support the front and rear ends of the cabin structure with freedom for longitudinal expansion relative to the frameworks.

12. A jet lift aircraft as claimed in claim 11, wherein the cabin structure is supported at its ends by means of spigots on the ends of the cabin structure sliding in sockets in the transversely-extending frameworks.

13. An aircraft capable of forward flight at speeds greater than Mach 1 comprising a body structure including parts forming the entire external surface of the aircraft which is in plan substantially an isosceles triangle of small apex angle, the apex being at the nose of the aircraft, and is in side elevation of elongated lenticular form, which parts are subject to friction heating in high speed flight; a cabin structure of substantially cylindrical shape accommodated within and entirely enclosed within the body structure; and means supporting the cabin in spaced relation to the parts of the body structure forming the external surface with freedom for relative expansion between the cabin structure and the aircraft body structure in the direction of each of the three dimensions of the cabin structure which means comprises frameworks secured within the body structure on each side of the cabin structure, trunnion connections between the frameworks and the cabin structure at a point between the ends of the cabin structure including stub axle members secured to the cabin structure and sockets in the frameworks, the stub axle members slidably engaging the sockets with freedom for sliding in the direction of the lateral dimension of the cabin structure whereby the cabin structure is free for relative expansion laterally of the aircraft relative to the body structure, further frameworks secured within the body structure beyond the front and rear ends of the cabin structure and sliding supporting connections between the ends of the cabin structure and said further frameworks, said supporting connections engaging the further frameworks with sliding freedom in a direction longitudinally of the cabin structure whereby the cabin structure is supported at its ends with freedom for longitudinal expansion relative to the body structure, the whole of the external surface of the cabin structure having a clearance from the body structure whereby the cabin structure is also free for expansion relative to the body structure in a direction at right angles to said longitudinal and lateral directions of expansion.

References Cited in the file of this patent

UNITED STATES PATENTS 2,142,997     Case                     Jan. 10, 1939
2,156,252     Cichero                Apr. 25, 1939

(Other references on following page)

UNITED STATES PATENTS

| | | | |
|---|---|---|---|
| 2,263,365 | Nicolaus et al. | Nov. 18, | 1941 |
| 2,275,771 | Kimbel | Mar. 10, | 1942 |
| 2,406,588 | Cornelius | Aug. 27, | 1946 |
| 2,497,153 | Cosakis | Feb. 14, | 1950 |
| 2,526,941 | Fishbein | Oct. 24, | 1950 |
| 2,619,302 | Loedding | Nov. 25, | 1952 |
| 2,715,001 | Provenzano | Aug. 9, | 1955 |
| 2,759,686 | Griffith | Aug. 21, | 1956 |
| 2,823,880 | Bergeson | Feb. 18, | 1958 |
| 2,838,928 | Bergeson | June 17, | 1958 |

OTHER REFERENCES

"Flight," issue of Feb. 4, 1955 (pages 134, 135 relied on).